United States Patent Office 2,759,845
Patented Aug. 21, 1956

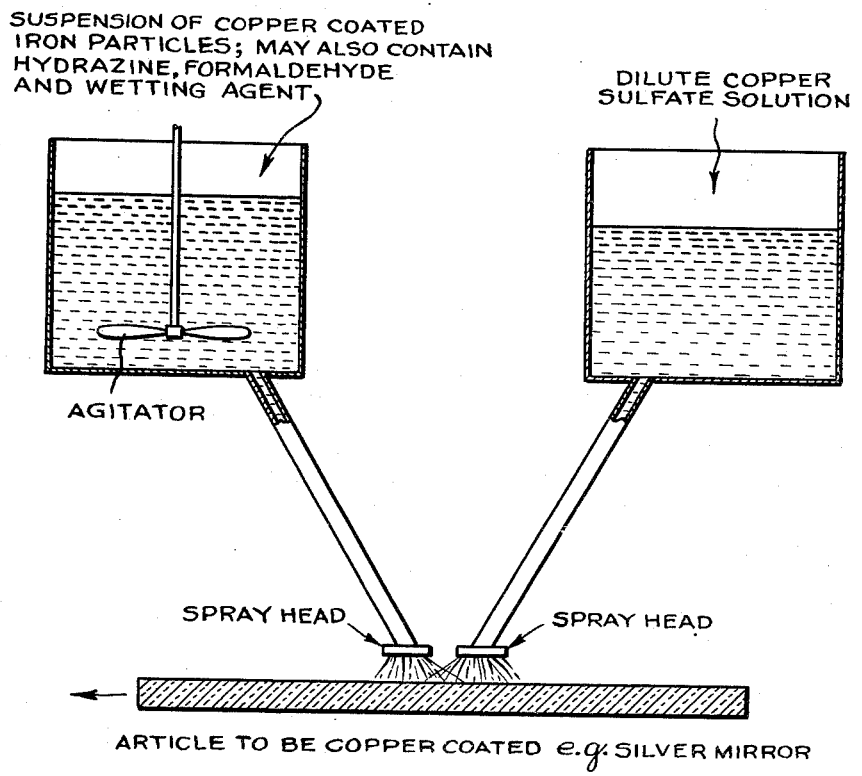

2,759,845

PROCESSES OF PRECIPITATING COPPER FROM COPPER SULFATE SOLUTIONS AND PRECIPITATING MEDIA FOR SO DOING

Henry H. Hilemn, Mount Vernon, N. Y., assignor to Metropolitan Mirror and Glass Co. Inc., Mount Vernon, N. Y., a corporation of New York Application October 25, 1954, Serial No. 464,633

8 Claims. (Cl. 117—35)

This invention relates to a method of producing a layer of copper on a silver surface, and more particularly to the production of a copper coating on the silver layer of a glass mirror. In this specification, unless otherwise indicated, all percentages and parts are on a weight basis.

The use of finely divided zinc or iron to deposit copper from a copper sulfate solution is, of course, well known and is disclosed, for example, in the Henderson Patent 60,514 of 1866, the Wilcox Patent 96,525 of 1869 and the Wilson Patent 1,792,262 of February 10, 1931. The application of these techniques to the production of a copper coating on the silver layer of a glass mirror gives rise to a number of problems, among which may be mentioned (1) the copper coating is blotchy or porous, or both blotchy and porous and (2) excessive sulfur-bearing corrosive fumes are produced and, even though a hood may be used for the purpose of drawing off these fumes, invariably some of the fumes escape into the surrounding atmosphere, attacking the conveying and other equipment employed with consequent rapid deterioration thereof.

It is among the objects of the present invention to provide a process of producing copper coatings on silver surfaces which process results in a uniform, homogeneous, firmly adherent, non-blotchy, bright copper layer and in the production of which layer the above-mentioned fume problem is greatly minimized, if not completely eliminated.

Another object is to provide a novel and improved precipitating medium for effecting precipitation of copper from copper sulfate.

Other objects and advantages of this invention will be apparent from the following detailed description thereof.

In accordance with this invention copper is precipitated from a dilute aqueous solution of copper sulfate acidified with sulfuric acid so that it has a pH within the range of 0.8 to 1.2, by intimately mixing this solution with an aqueous suspension of copper-coated finely divided iron particles, the suspension containing a wetting agent and hydrazine and formaldehyde in a ratio of approximately 15 to 25, preferably about 20, parts of formaldehyde (containing 40% formaldehyde) per part of hydrazine (containing 64% hydrazine).

The copper-coated finely divided iron particles should have a particle size such that they can be sprayed without clogging the nozzle of the spraying equipment used for this purpose. In general, particles having a maximum dimension not exceeding about 0.1 mm., desirably within the range of from 0.1 to 0.005 mm., will be found satisfactory. The copper-coated iron particles employed in accordance with this invention are produced by immersing finely divided iron particles of a size indicated above in a copper sulfate solution produced by dissolving copper sulfate in water. The copper sulfate solution used may have a concentration of from 5% to 10% of copper sulfate. To this solution is added sufficient sulfuric acid to bring the pH of the solution within the range of from 3 to 6, preferably about 5.

The formation of the copper-coated iron particles is effected by immersing the finely divided iron particles in a copper sulfate solution having a pH as above set forth and vigorously agitating the mixture. The satisfactory deposition of copper on the iron particles will be evident by the exhausted copper content of the solution. In general, 5 minutes agitation of the acidified copper sulfate solution containing the iron particles will suffice to produce the copper-coated iron particles. These particles contain from about 0.15% to 2% of copper based on the weight of the iron.

The copper-coated iron particles thus produced are thereafter washed with water, drained, then washed with alcohol, preferably methanol, to remove the remaining moisture. If the copper-coated iron is not used immediately, it is suspended in a solution of a slightly alkaline mixture of glycerin and alcohol, i. e., a mixture having a pH of about 7½ to 8½. This mixture serves as a medium to prevent the caking, which would otherwise take place, of the coated iron particles during long periods of storage. The mixture contains from 1 to 2 parts alcohol per part of glycerin. Use of methanol as the alcohol is preferred for reasons of economy, although other alcohols, such as ethanol, may be used. Sodium carbonate or other alkali may be used to impart the desired alkalinity to the copper-coated iron particles. The resultant suspension of copper-coated iron particles in the glycerin-alcohol mixture may have a concentration of copper-coated iron particles of from 70% to 75%, of alcohol of from 12.5% to 15% and of glycerin of from 12.5% to 15%, by volume. It remains as a free-flowing suspension during storage and shipment and when added to water to produce the suspension employed for precipitating the copper on the silver surface results in a suspension which will not plug the spray guns.

The solution of chemical reducing agents containing the wetting agent employed along with the suspension of copper-coated iron particles is made by mixing hydrazine, in the form of hydrazine hydrate, with formaldehyde and a wetting agent to produce a solution having the desired concentration. The hydrazine is a strong reducing agent and, if used alone, reaction would be difficult, if not impossible, to control. In accordance with the present invention the hydrazine is mixed with formaldehyde in the ratio of approximately 15 to 25, preferably about 20, parts of formaldehyde (40% concentration) per part of hydrazine (64% concentration), to produce a mixture which gives the desired reducing action and yet presents no problems from the standpoint of controlling the reaction. In the production of the solution containing the reducing and the wetting agents hydrazine hydrate is used as the source of the hydrazine; commercial formaldehyde, e. g., formalin, formaldehyde polymers, etc., may be used as the source of formaldehyde; and triethanolamine may be employed as the wetting agent. These constituents, diluted with water as necessary, are mixed in proportions to produce a stock solution containing by volume from 22 to 24 parts of water, from 1 to 2 parts of hydrazine (bases 64% hydrazine), from 15 to 50 parts of formaldehyde (bases 40% formaldehyde) and from 15 to 50 parts of triethanolamine. In use, this stock solution containing the hydrazine, formaldehyde and triethanolamine is diluted by the addition of water and to the resultant solution is added the copper-coated iron producing a suspension of the latter in the aqueous medium containing the chemical reducing agents and the wetting agent. From 1.5 to 2 pounds of copper-coated iron are added per gallon of stock solution. For example, 40 gallons of water may be used per gallon of this stock solution containing the chemical reducing agents and the wetting agent and to this solution about 2 pounds of copper-coated iron may be added to produce the suspension of copper-coated iron in the aqueous medium containing chemical reducing agents and the wetting agent, which suspension is mixed with the copper sulfate solution hereinbelow described. The suspension thus produced contains, by weight, about 2% to 4% copper-coated iron particles, about 0.0002% hydrazine, about 0.001% formaldehyde, and about 0.001% triethanolamine, the rest being water.

To produce the copper sulfate solution, copper sulfate of commerce may be used and dissolved in water to yield a solution containing about 6 to about 10, preferably about 8 ounces copper sulfate per gallon of water, i. e., having a concentration of about 5% to about 8%, of copper sulfate. To this solution is added enough sulfuric acid to give it a pH of about 0.8 to 1.2. This is an important feature of the invention. If the pH of the solution is too high, i. e., above 1.2, not enough copper will deposit on the silver surface. If the pH of the solution is below 0.8, the deposit of the copper on the silver will invariably be hard and brittle and a satisfactory deposition of copper on the silver surface will not result.

In use the stock solution thus produced, having a concentration of from about 5% to about 8% copper sulfate and a pH of from 0.8 to 1.2, is diluted with approximately 40 gallons of water per gallon of stock solution.

In forming the copper coating, the copper sulfate solution having a pH of from 0.8 to 1.2, hereinabove described, is intimately mixed in approximately equal amounts with the suspension of copper-coated iron particles containing hydrazine, formaldehyde and triethanolamine, hereinabove described. The temperature at which the mixing is effected is desirably that of the surrounding atmosphere. Also it is desirable to agitate the copper sulfate solution; the suspension of copper-coated iron particles should be agitated as it is fed to the spraying mechanism to maintain these solid particles uniformly distributed and suspended in the aqueous medium containing the chemical reducing agents.

The invention may be utilized in the continuous production of silvered glass mirrors in which plates of glass in either vertical, horizontal or inclined position, preferably horizontal, are fed continuously under any well-known silvering solution. Thus, silver nitrate or silver ammonium nitrate and a reducing solution, such as dextrin, formaldehyde, Rochelle salt, etc., may be simultaneously sprayed on the glass surface to produce a silver layer on the glass base. As the production of such silver layer is well known, it is believed further description thereof is unnecessary. In the continuous production of copper coated silver surfaces the copper is deposited on the silver while the silver layer is still wet. Thus, for example, the glass may pass continuously, being carried on a conveyor for this purpose, first through a station where the silver layer is applied and then to a station where the copper coating is applied. In accordance with this invention at the copper coating station one tank may be provided containing the copper sulfate solution having a pH of from about 0.8 to 1.2 and a concentration of about from about 0.1% to about 0.2% copper sulfate, and another tank containing the slurry or suspension of copper-coated iron particles and the mixture of chemical reducing and wetting agents hereinabove set forth in the concentration hereinabove noted for application to produce the copper coating. The contents of both of these tanks may be agitated, say by means of a propeller type of agitator or by bubbling air through the tanks. In this way the solution and suspension sprayed remains uniform throughout the operation and settling of the suspended copper-coated iron particles is avoided. The solution of copper sulfate and the suspension of copper-coated iron particles containing the chemical reducing agents and the wetting agent are sprayed so that the sprays intermingle and the sprayed material mixes just before it deposits on the wet silver layer. As the conveyor moves from the copper coating station it passes through a station where a spray of water is played on the glass surface containing the copper coating. In this way excess copper sulfate and copper-coated iron particles are removed. Thereafter the processed mirror passes through a drying station where a current of air is passed thereover effecting partial drying, and then passes through a heater, which may be in the form of a bank of infra-red lamps, to complete the drying. From this drying treatment the mirror may be passed to a station where a transparent or opaque lacquer or other lacquer or paint coating is applied to the copper coating.

The accompanying drawing is a flow sheet diagram illustrating one process embodiment of this invention; the legends on this flow sheet render it self-explanatory.

The above described procedure results in uniform, homogeneous, non-blotchy, non-porous and bright copper layers firmly adherent to the silver reflecting surface. The application of the solution of copper sulfate and finely divided copper-coated iron particles is carried out under a hood to remove whatever gas fumes may be generated. It has been found in operation that, while some fumes are generated, the amount is far less than that generated in prior known procedures involving the use of zinc or iron (not coated with copper) for effecting precipitation of copper from copper sulfate. Thus, the present invention results in a material minimization, if not the elimination, of the fume problem.

Since certain changes in carrying out the process and certain modifications in the medium for precipitating copper from copper sulfate solutions which embody this invention may be made without departing from the scope of this invention, it is intended that all matter contained in the above description shall be interpreted in an illustrative and not in a limiting sense.

What is claimed is:

1. In a process of precipitating copper from a copper sulfate solution, the improvement which comprises intimately mixing a dilute copper sulfate solution with a suspension of finely divided iron particles pre-coated with copper, said suspension containing said copper pre-coated iron particles in amount sufficient to effect precipitation of the copper from the copper sulfate solution upon the intimate mixing of said copper sulfate solution with said suspension.

2. In a process of precipitating copper from a copper sulfate solution, the improvement which comprises intimately mixing a dilute copper sulfate solution with an aqueous suspension of iron particles pre-coated with copper and containing from approximately 2% to approximately 4% of such particles, said suspension also containing hydrazine and formaldehyde, the concentration of copper pre-coated iron particles, hydrazine and formaldehyde in said suspension being sufficient to effect precipitation of the copper from the copper sulfate solution upon the intimate mixing of said copper sulfate solution with said suspension.

3. In a process of precipitating copper from a copper sulfate solution, the improvement which comprises intimately mixing a dilute copper sulfate solution with a suspension containing approximately 2% to approximately 4% by weight of iron particles pre-coated with copper, said suspension also containing a wetting agent, hydrazine and formaldehyde in a ratio equal to 15 to 50 parts of formaldehyde containing 40% formaldehyde to from 1 to 2 parts hydrazine containing 64% hydrazine.

4. The process as defined in claim 3, in which the wetting agent is triethanolamine.

5. A process of depositing copper on a surface, which comprises spraying an aqueous copper sulfate solution containing from 0.1% to 0.2% copper sulfate and sulfuric acid in amount to impart to said solution a pH of from 0.8 to 1.2, simultaneously spraying an aqueous suspension of copper-coated iron particles containing approximately 2% to 4% of such particles, said suspension also containing about 0.0002% hydrazine, about 0.001% formaldehyde and about 0.001% triethanolamine, the said suspension and solution of copper sulfate being sprayed so that the sprays intermingle and the resultant mixture is deposited on said surface on which it is desired to deposit said copper.

6. A continuous method of producing silvered mirrors, which comprises continuously moving plates of glass, continuously applying to one side of each plate a silver salt and a reducing agent to form a silver surface on said plate, continuously applying to said silver surface while it is still wet a spray of aqueous copper sulfate solution having a pH of from 0.8 to 1.2, said solution having a concentration of approximately 0.1% to 0.2% copper sulfate, and a suspension of copper-coated finely divided iron particles, said particles having a size within the range of from 0.1 to 0.005 mm., said suspension having a concentration of about 2% to about 4% of said copper-coated iron particles and also containing about 0.0002% hydrazine, about 0.001% formaldehyde and about 0.001% triethanolamine, the said suspension and said solution of copper sulfate being sprayed in approximately equal amounts and the resultant mixture deposited on the said silver surface thus forming a layer of copper on said silver surfaces.

7. A suspension of copper-coated iron particles in glycerin and a monohydroxy aliphatic alcohol, which suspension remains free flowing during storage and shipment, said suspension containing from 70% to 75% by volume of said copper-coated iron particles, from 12.5% to 15% by volume of said alcohol, from 12.5% to 15% by volume of glycerin, and also containing alkali in amount to produce a mixture having a pH of approximately 8.

8. An aqueous suspension of copper-coated iron particles containing from 2% to 4% by weight of said copper-coated iron particles, about 0.001% by weight of formaldehyde, about 0.0002% by weight of hydrazine and about 0.001% by weight of triethanolamine.

References Cited in the file of this patent

UNITED STATES PATENTS

| | | |
|---|---|---|
| 1,431,395 | Grinlinton | Oct. 10, 1922 |
| 1,922,254 | McCulloch | Aug. 15, 1933 |
| 2,405,302 | Griffith et al. | Aug. 6, 1946 |
| 2,602,757 | Kantrowitz et al. | July 8, 1952 |
| 2,610,118 | Drapeau | Sept. 9, 1952 |
| 2,664,343 | Meth | Dec. 29, 1953 |

FOREIGN PATENTS

| | | |
|---|---|---|
| 661,346 | Great Britain | Nov. 21, 1951 |

OTHER REFERENCES

Wein: Metallizing Non-Conductors, published by Metal Industry Pub. Co., New York, N. Y., 1945, pp. 41–43.